J. A. OSENBRUCK.
Lubricators.
No. 138,274.
2 Sheets--Sheet 1.
Patented April 29, 1873.
Fig. I.
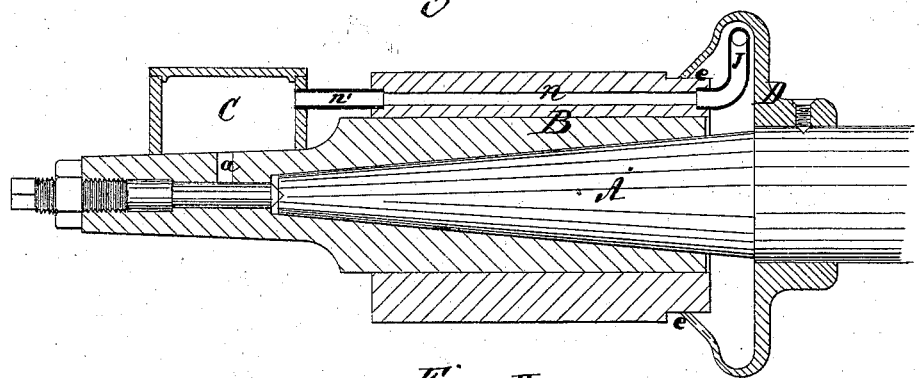
Fig. II.
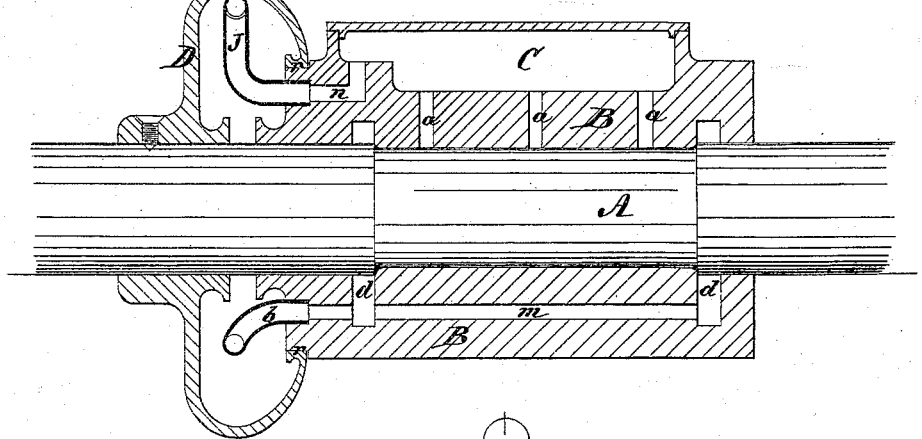
Fig. III.
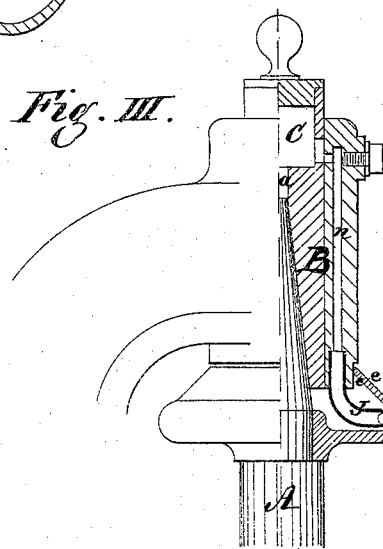
Witnesses.
Inventor.

J. A. OSENBRUCK.
Lubricators.
No. 138,274.
2 Sheets--Sheet 2.
Patented April 29, 1873.
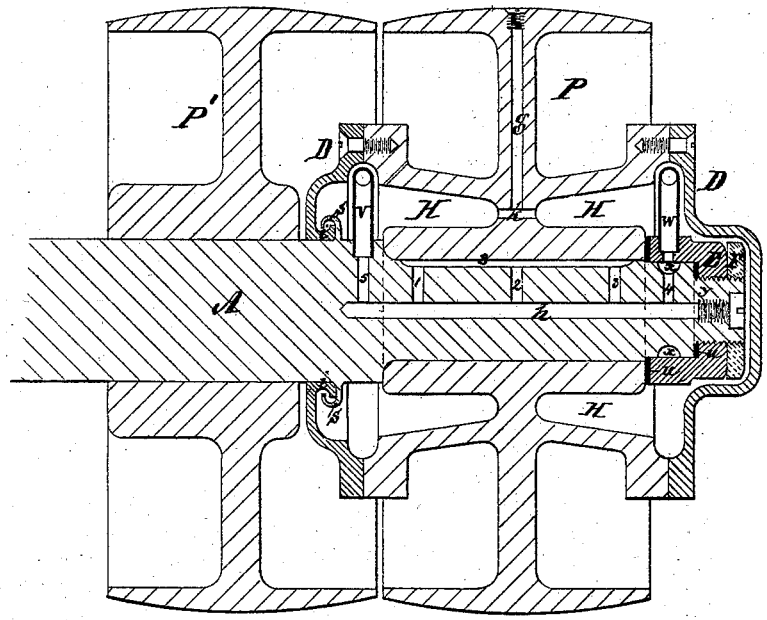
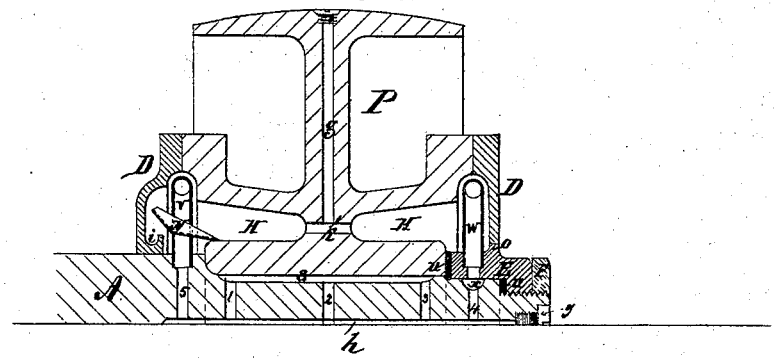
Witnesses.
Inventor.

UNITED STATES PATENT OFFICE.

JOHANNES A. OSENBRÜCK, OF HEMELINGEN, GERMANY.

IMPROVEMENT IN LUBRICATORS.

Specification forming part of Letters Patent No. 138,274, dated April 29, 1873; application filed April 2, 1873.

*To all whom it may concern:*

Be it known that I, JOHANNES AUGUST OSENBRÜCK, of Hemelingen, in the Kingdom of Prussia, Germany, have invented certain Improvements in Lubricators, of which the following is a specification:

This invention consists in the construction of a lubricator for bearings of quickly-rotating shafts, such as circular saws, wood-planing machines, ventilators, &c., as well as for swift-rotating movable or loose pulleys, or similar objects.

The principle on which this lubricating apparatus is based is the centrifugal power. For each bearing to be lubricated by means of this apparatus, a circular cup will be applied on the respective shaft, made of cast or wrought iron, glass, or any other metal, moving in an exact concentric circle with it. On the outward cover of the bearing, turned to the cup, a small pipe is applied, reaching into the cup, and crooked or bent in such a manner that its interior opening stands opposite the direction of the motion or turning of the cup, whereby the exterior edge of the opening of the pipe is brought nearest to the interior greatest circumference of the cup. When the cup containing a quantity of liquid lubricating material is brought into swift rotation, the grease will be spread circularly over the greatest interior diameter of the cup, and, as it participates with the rotation of the latter, it is taken up by this small pipe, and, with more or less vehemence, according to the velocity of the circumference of the cup, the grease will be brought back into the journal-box, from where, after having passed and lubricated the journal, it comes back once more into the revolving centrifugal cup, to be brought back again into the journal-box. For the purpose that the liquid grease that trickles down from the journal will be brought back into the centrifugal cup, the journal-boxes on the end toward the cup are turned concentrically to the shaft, and are inclosed by the opening of the cup. By this arrangement no loss of lubricating matter is possible, and the same will be used to the utmost extent.

In the accompanying drawing, Figures I, II, and III represent lubricating apparatus embodying my invention, as applied to horizontal and vertical shaft-bearings. Figs. IV, V represent the lubricating apparatus as applied to loose pulleys.

In Fig. I A is the journal of a shaft turning in the bearing B, upon which a grease-box, C, is fixed, communicating through the hole $a$ with the interior bearing. D is a circular cup fastened to the shaft and fitting upon the concentrical part $e$ of the bearing. In the upper part of this bearing B a pipe, J, is attached, bent, and extending into the cup D, and communicating through the channel-way $n$ and pipe $n'$ with the grease-box C. When the shaft is revolving the lubricating material will pass from the box C through the hole $a$ to the interior of the bearing, and then pass from the end of said bearing into the cup D, where, by the centrifugal force, it will spread over the greater interior diameter of said cup D, and will be taken up by the pipe J and brought back, through said pipe J, passage $n$, and pipe $n'$, into the grease-cup C to be used over again.

In Fig. II A represents a journal of a shaft running in a suitable bearing, B, on the top of which the grease-cup C is arranged. This cup C communicates through holes $a\ a\ a$ with the journal, for the purpose of lubricating the same. On each side of the journal-bearing recesses $d\ d$ are arranged to gather and collect the grease which trickles from the bearing, and which said recesses are connected through the channel-way $m$, provided on one end with a pipe, $b$, extending into the cup D. On one side of the bearing B a cup, D, is attached to the shaft, fitting upon the concentric turned part $r$ of the bearing, forming a close cup. Into the upper part of the bearing B a pipe, J, is fastened, connecting, through the hole $n$, with the grease-cup C, and bent upward, extending nearly to the interior diameter of the cup D. The grease, after having lubricated the journal A, is collected in the recesses $d\ d$, and passes then through the channel $m$ and pipe $b$ into the cup D, where it is, through the centrifugal force, thrown and spread over the greatest interior diameter, and taken up by the pipe J and passed back again into the cup C.

In Fig. III the end bearing of a vertical shaft is represented, where B is the bearing;

A, the shaft to which the cup D, below the bearing, is attached. The grease-reservoir C is formed in the upper part of the bearing B, which communicates through the hole $a$ with the journal of the shaft. On one side of the bearing a channel-way, $n$, is arranged, communicating with the grease-cup C, and having on its lower end a pipe, J, attached, bent outward, and extending to the extreme internal diameter of the cup D, and through which said pipe J the grease is taken up from the cup D and forced through the channel $n$ back again into the grease-cup C.

In Fig. IV is represented a fast and loose pulley with the lubricating apparatus attached. P' is the fast and P the loose pulley. A represents the shaft, which is turned down where the loose pulley is fixed, and is provided with a nut-ring, E, and lock-nut, F, to prevent the horizontal dislocation of the loose pulley. On each side of the hub of the loose pulley P pipes $v$ and $w$ are fastened into the shaft A, the one, $v$, directly and other, $w$, indirectly, by being screwed in the nut-ring E, the inner opening connecting with the groove $x$, which latter communicates through hole 4 with the central bore-hole $h$, while the pipe $v$ connects through the hole 5 with said central bore-hole $h$. To prevent the escape of oil from the groove $x$ to the outside, collars $u$ of leather or lead are laid between the nut-ring E and the raised part of the shaft A. The central bore-hole $h$ is also made oil-tight by a suitable screw, $y$. The central bore-hole $h$ is connected by three or more grease-holes, 1 2 3, with a groove, $s$, made in the shaft journal or bearing. In the hub of the pulley P cavities H are arranged, which serve as grease-boxes and centrifugal cups, and which said cavities H are closed oil-tight by suitable cups or caps D. These cavities H are connected through holes $k$ in communication with a hole, $g$, closed by means of a suitable screw, and through which these cavities are supplied with the required lubricating grease or oil.

The effect of this arrangement is the following: The pulley P, when it is in motion or rotation on the immovable part of the shaft A, will force the oil by the centrifugal force against the inner largest diameter of the cavities or cups, where it will be taken up by the stationary pipes $v\ w$, and will be driven through said pipes $v\ w$ to the central bore-hole $h$, and from there through the holes 1 2 3 to the bearing of the pulley.

Contrary to the method of lubricating hitherto applied, whereby the oil will be immediately repulsed from the rotating planes, it will by this arrangement be supplied more energetically as the rotation of the pulley becomes swifter.

To prevent the scattering of the oil the inner cap D surrounds tightly the shaft A, and is provided with a groove, $i$, over which grasps a disk, S, fast to the shaft A. The outer cover or cap D incloses the nut-ring E and lock-nut F, preventing any escape of oil. When the loose pulley P is placed at any part on the length of the shaft, the central part of the outer cap D is fitted upon a suitable projection or collar, $o$, on the nut-ring E, as shown in Fig. V. Instead of the disk S a collar, N, inclined toward the inner side and laid around the lubricating-tube $r$, (see Fig. V,) may be arranged, which conveys the oil scattered toward the inside into the cavity H. This mode of lubricating can be used likewise for conducting shafts in that way, that a centrifugal cup fixed on a particular swift rotating axle, and driven from the main shaft, drives the oil contained in it into a grease-conserver, which is placed higher than all bearings to be lubricated, from where it will be conducted to the bearings through small pipes; these bearings being in that case constructed similar to the bearing represented in Fig. II, with the exception that the trickling oil from the same will be conducted through the pipe $b$ to the centrifugal cup placed on that shaft.

What I claim as my invention, and desire to secure by Letters Patent, is—

1. The arrangement of circular cups on the rotating shaft or on a loose pulley, in combination with a stationary pipe or pipes, whereby oil collected in said cup, and thrown by the centrifugal force against the inner periphery of said rotating cup, is caught by said stationary pipe or pipes and conveyed through the same either into the grease-cup or into the bearing, substantially as and for the purpose set forth.

2. The centrifugal cup D, attached to the revolving shaft A, in combination with pipe J, attached to the bearing B, and connected through suitable holes with the grease-cup C, operating in the manner and for the purpose substantially as described.

3. The recesses $d\ d$, channel-way $m$, and pipe $b$ in the shaft-bearing, in combination with a centrifugal cup, D, fast to the revolving shaft, and pipe J fast to the upper part of the shaft-bearing, connected with the lubricating-cup C, substantially in the manner and for the purpose hereinbefore set forth and specified.

4. The cavities H in the loose pulley, closed by suitable cups D, in combination with pipes $v$ and $w$, attached to the shaft and connected through suitable holes or channel-ways with a groove, $s$, or with the internal bearing of said pulley, and operating in the manner and for the purpose substantially as hereinbefore set forth and described.

Hemelingen, February 15, 1873.

JOHANNES AUGUST OSENBRÜCK.

Witnesses:
 M. KLENCKE,
 T. H. KLENCKE.